(12) United States Patent
Kim

(10) Patent No.: US 10,228,300 B2
(45) Date of Patent: Mar. 12, 2019

(54) APPARATUS FOR EVALUATING WATERTIGHT STATE OF VEHICLE AND METHOD FOR CONTROLLING THE SAME

(71) Applicants: Hyundai Motor Company, Seoul (KR); Kia Motors Corporation, Seoul (KR)

(72) Inventor: Jong Gu Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 43 days.

(21) Appl. No.: 15/602,656

(22) Filed: May 23, 2017

(65) Prior Publication Data

US 2018/0172542 A1    Jun. 21, 2018

(30) Foreign Application Priority Data

Dec. 15, 2016    (KR) .................. 10-2016-0171743

(51) Int. Cl.
| | |
|---|---|
| *G06T 7/00* | (2017.01) |
| *G01M 3/02* | (2006.01) |
| *B05B 12/02* | (2006.01) |
| *B05B 12/08* | (2006.01) |
| *B05B 12/04* | (2006.01) |
| *H04N 7/18* | (2006.01) |

(52) U.S. Cl.
CPC ............ *G01M 3/02* (2013.01); *B05B 12/02* (2013.01); *B05B 12/04* (2013.01); *B05B 12/082* (2013.01); *G06T 7/0004* (2013.01); *H04N 7/181* (2013.01); *G06T 2207/30108* (2013.01); *G06T 2207/30268* (2013.01)

(58) Field of Classification Search
None
See application file for complete search history.

(56) References Cited

U.S. PATENT DOCUMENTS

2001/0035256 A1* 11/2001 Hall ..................... B29C 51/00
                                                           156/212
2016/0272164 A1*  9/2016 Hsiao ..................... B08B 3/10

FOREIGN PATENT DOCUMENTS

| KR | 10-1260674 B1 | 5/2013 |
| KR | 10-1413331 B1 | 7/2014 |

* cited by examiner

Primary Examiner — Delomia L Gilliard
(74) Attorney, Agent, or Firm — Morgan, Lewis & Bockius LLP

(57) ABSTRACT

An apparatus for evaluating a watertight state of a vehicle and a method for controlling the apparatus may include an automatic ejection device having a plurality of nozzles to automatically eject water to the glass on the inside of the vehicle, an additional ejection device configured to additionally eject water separately from the automatic ejection device, a plurality of cameras configured to photograph flows of the water when water is ejected by the automatic ejection device and the additional ejection device, so that evaluation of a watertight state between the vehicle body and the glass may be preliminarily verified by allowing the water to a lower end portion of the glass through the automatic ejection device and the additional ejection device, photographing the flows of the ejected water through the cameras, and detecting whether water is introduced into the internal of the vehicle.

9 Claims, 5 Drawing Sheets

APPARATUS FOR EVALUATING WATERTIGHT STATE OF VEHICLE AND METHOD FOR CONTROLLING THE SAME

CROSS-REFERENCE(S) TO RELATED APPLICATIONS

The present application claims priority to Korean Patent Application No. 10-2016-0171743, filed on Dec. 15, 2016, the entire contents of which is incorporated herein for all purposes by this reference.

BACKGROUND OF THE INVENTION

Field of the Invention

The present invention relates to an apparatus for evaluating the watertight state of a vehicle by which a watertight-related function of the vehicle may be evaluated so that introduction of water to a lower end portion of glass of the vehicle may be prevented when the glass is tinted, and a method for controlling the same.

Description of Related Art

In general, window glasses, such as a windshield glass and a rear glass, are for securing the front and rear fields of view and front door and rear door glasses for securing the left and right fields of view are disposed in a vehicle.

Meanwhile, tinting films are disposed on the window glasses to shield ultraviolet rays and the heat from sunlight. to attach a tinting film, an operator preliminarily bonds the tinting film to a glass window after spraying or applying tap water to the glass window by use of a manual sprayer, or a bucket, and then completely attaches the tinting film to the glass by sweeping the tinting film with a rubber plate.

However, according to the related art, as water is sprayed manually it flows inaccurately according to the location of the sprayer due to the different amount of ejected water. Convenience of the operation deteriorates as water is introduced into the vehicle, causing a breakdown of the vehicle when an excessive volume of water is sprayed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for evaluating the watertight state of a vehicle and a method for controlling the same, and is directed to evaluating a watertight-related function to prevent water from being introduced to a lower end portion of a glass of a vehicle when the glass is tinted.

The technical problems to be solved by the present invention are not limited to the aforementioned problems, and any other technical problems not mentioned herein will be clearly understood from the following description by those skilled in the art to which the present invention pertains.

According to various aspects of the present invention, an apparatus for evaluating the watertight state of a vehicle may include an automatic ejection device having a plurality of nozzles configured to automatically eject water towards a glass on the inside of the vehicle, an additional ejection device configured to eject water separately from the automatic ejection device, and a plurality of cameras configured to photograph the flow of water when water is ejected by the automatic ejection device and the additional ejection device.

The apparatus may further include a control device configured to control the ejection of the water while interworking with the automatic ejection device and the additional ejection device and identify introduction of the water into the internal of the vehicle through materials captured by the cameras.

The plurality of nozzles included in the automatic ejection device may eject the water in a plurality of steps through the control of a button, and may allow the control of an ejection time period and the volume of ejected water.

Each of the plurality of nozzles may be provided with an on or off valve wherein the nozzles are independently switched on or off.

The automatic ejection device may have a curved structure to be parallel to a front surface of the inside of the glass and is fixed to the glass.

The additional ejection device may include an instantaneous ejection device configured to eject a large volume of water to the glass manually or automatically by use of a control button, and a manual ejection device configured to eject water manually to a specific location of the vehicle, including the glass.

The apparatus may further include a body, on which the automatic ejection device and the additional ejection device are mounted and which is disposed with the control device and the cameras.

The body may include a water tank configured to supply water to the automatic ejection device and the additional ejection device and store the water.

The body may be movable.

The body may further include a monitor connected to the control device used to identify the material photographed by the cameras.

The body may further include a connector configured to move the automatic ejection device and the additional ejection device to the internal of the vehicle and fix the automatic ejection device and the additional ejection device.

The water tank may include a filter configured to filter the water supplied to the automatic ejection device and the additional ejection device.

According to various aspects of the present invention, a method of controlling an apparatus for evaluating the watertight state of a vehicle may include automatically ejecting water through an automatic ejection device toward a glass on the inside of the vehicle, ejecting water through an additional ejection device, photographing flows of the ejected water through a camera, and identifying and analyzing a captured image.

The ejection of water through the additional ejection device may include automatically ejecting water according to the number of repetitions for a predetermined ejection time period, and manually ejecting water for a predetermined ejection time period.

The ejection of water through the additional ejection device may further include adjusting an ejection time period, the volume of ejected water, and manually ejecting water.

The captured image may be identified by a monitor so that flow of water on a lower portion of the glass is determined.

The methods and apparatuses of the present invention have other features and advantages which will be apparent from or are set forth in more detail in the accompanying drawings, which are incorporated herein, and the following Detailed Description, which together server to explain certain principles of the present invention.

Figure 1:
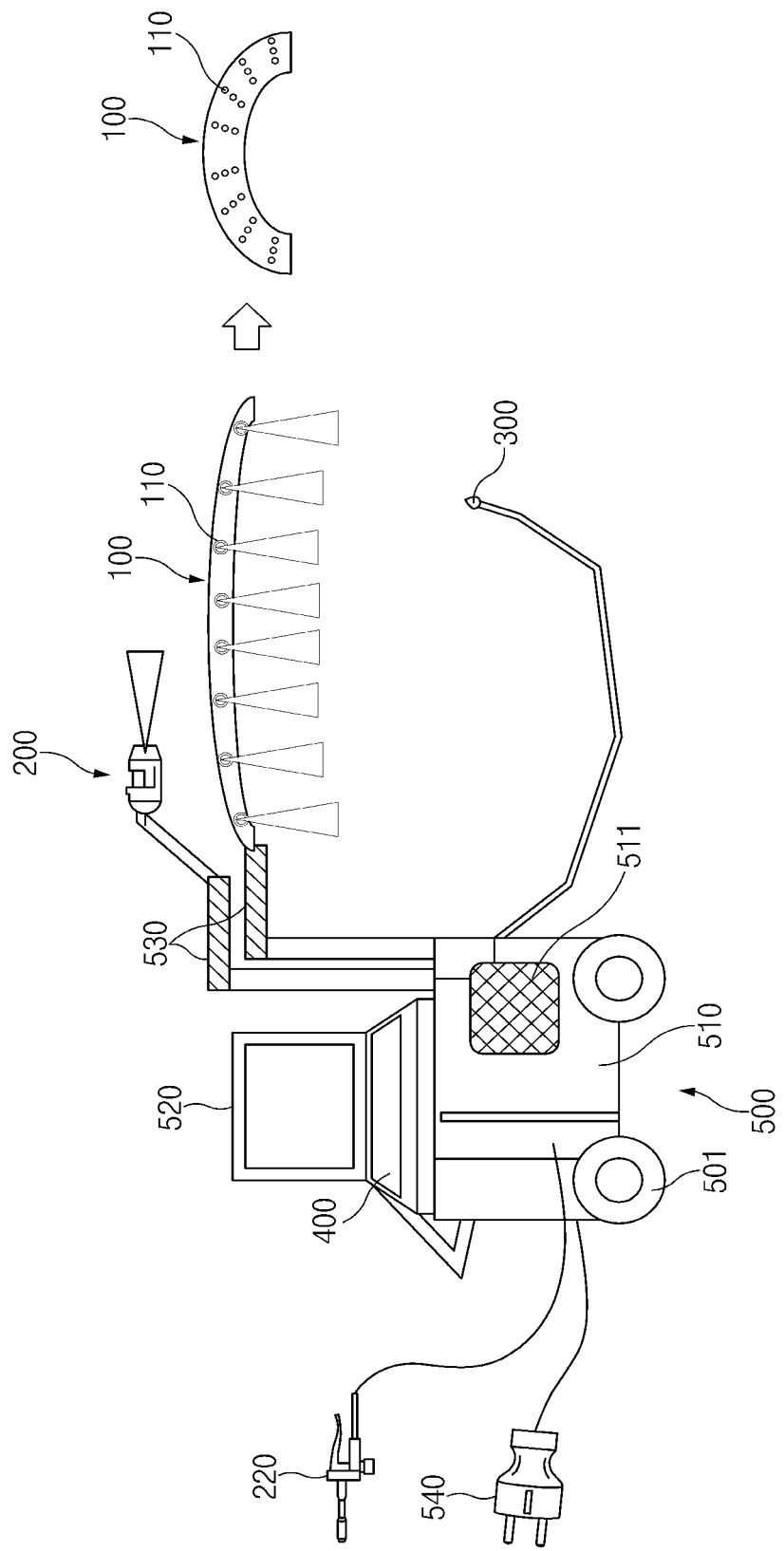
FIG. 1 is a view illustrating an apparatus for evaluating a watertight state of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawing and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

As illustrated in FIG. 1, an apparatus for evaluating the watertight state of a vehicle according to an exemplary embodiment of the present invention includes an automatic ejection device 100 configured to automatically eject water, an additional ejection device 200 configured to additionally eject water, and a camera 300 configured to photograph flows of water as the water is ejected.

The automatic ejection device 100 automatically ejects water to a glass 1 on the inside of the vehicle.

Then, the automatic ejection device 100 may have a plurality of nozzles 110 to eject water.

The plurality of nozzles 110 allow for the ejection of water in a plurality of steps through control of a button and allows control of an ejection time period and an amount of ejected water Further, the volume of water ejected by the nozzles 110 is classified according to a first purging operation, a second purging operation, and a third purging operation. The purging operations are controlled through the manipulation of a button wherein the flow rate of ejected water in the first purging operation is set to 1000 cc/min, the flow rate of ejected water in the second purging operation is set to 2500 cc/min, and the flow rate of ejected water in the third purging operation is set to 5000 cc/min.

Further, each of the plurality of nozzles 110 are disposed with an on or off valve 111 wherein the nozzles 110 may be independently switched on or off to adjust the amount of ejected water.

Figure 2:
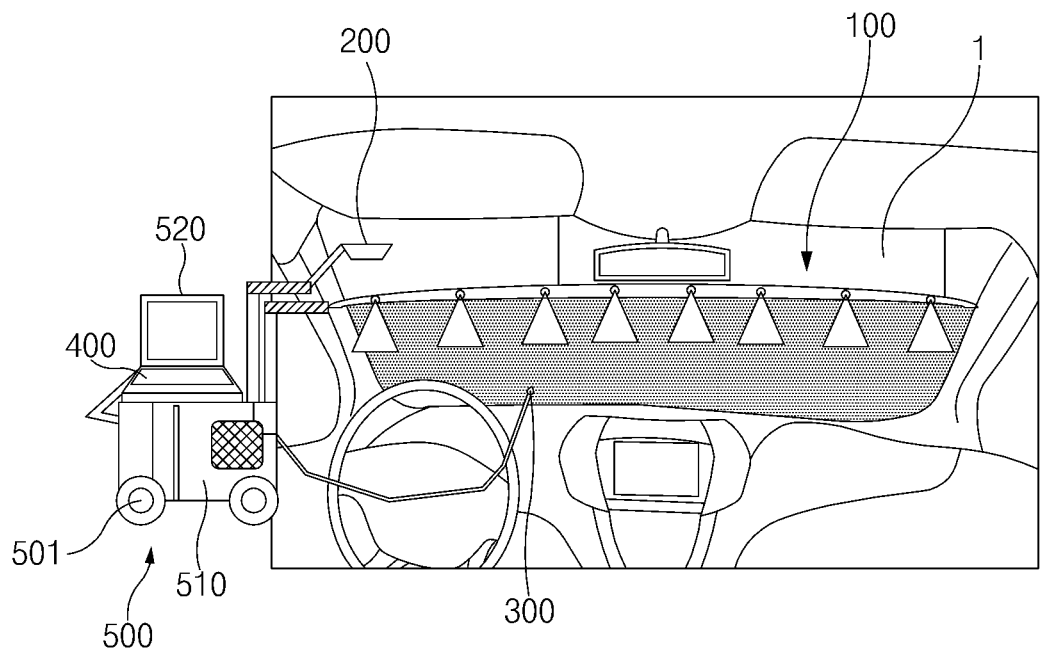
FIG. 2 is a view illustrating an exemplary embodiment of the apparatus for evaluating a watertight state of a vehicle according to an exemplary embodiment of the present invention.

As illustrated in FIG. 1 and FIG. 2, the automatic ejection device 100 has a curved structure to be parallel to the front surface of the inside of the glass 1, and is fixed to the glass 1 to prevent water from being ejected to parts other than glass 1 when water is ejected.

Then, the location, to which the automatic ejection device 100 ejects water, is the windshield glass, but also may be ejected to a side glass or a rear glass according to situations.

The additional ejection device 200 additionally ejects water, separately from the automatic ejection device 100.

Further, the additional ejection device 200 includes an instantaneous ejection device 210 configured to eject a large amount of water to the glass 1 manually or automatically by use of a control button; and a manual ejection device 220 configured to eject water manually to a specific location of the vehicle, including the glass 1.

Here, the instantaneous ejection device 210 of the additional ejection device 200 manually or automatically sets a volume of ejected water to 100 cc or 500 cc when the water is ejected wherein the water is ejected after the volume of ejected water is selected. Meanwhile, when the instantaneous ejection device 210 automatically ejects water, the number of ejections is controlled and an ejection interval is set.

A plurality of cameras 300 photograph the flows of water at a lower end portion of the glass 1 after water is ejected by the automatic ejection device 100 and the additional ejection device 200.

Control device 400 interworks with the automatic ejection device 100 and the additional ejection device 200 to control the ejection of water, and evaluates the watertight state between a vehicle body and the glass by identifying the introduction of water into the internal of the vehicle through the material captured by the cameras 300.

Meanwhile, the present invention includes a housing-shaped body 500, on which the automatic ejection device 100 and the additional ejection device 200 are mounted. The body 500 is disposed with the control device 400 and the camera 300.

The body 500 includes a water tank 510 configured to supply water to the automatic ejection device 100 and the additional ejection device 200, and store the water supplied to the automatic ejection device 100 and the additional ejection device 200.

The water tank 510 is disposed with a filter 511 wherein the water stored in the water tank 510 is supplied to the automatic ejection device 100 and the additional ejection device 200 after being filtered by the filter 511.

Further, the water tank 510 is disposed with a water level sensor configured to detect the amount of the water stored in the water tank 510 and a pump 512 (see FIG. 3) configured to supply water. Meanwhile, one surface of the water tank 510 is transparent wherein the level of water may be visually identified.

Figure 3:
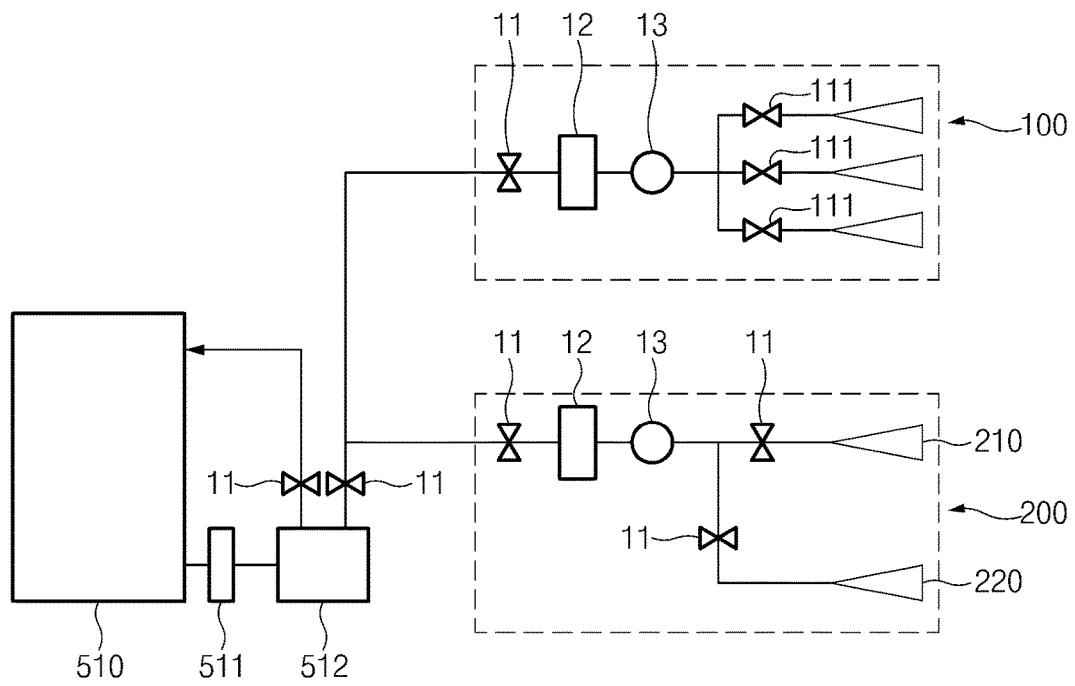
FIG. 3 is a structural view illustrating a water tank, an automatic ejection device, and an additional ejection device in the apparatus for evaluating a watertight state of a vehicle according to an exemplary embodiment of the present invention.

As illustrated in FIG. 3, the water tank 510 supplies the water filtered by the filter 511 to the automatic ejection device 100 and the additional ejection device 200 via the pump 512. A direction switching valve 11, a flow rate control valve 12, and a flow rate detector 13 are included between the automatic ejection device 100 and the pump 512 to control supply of water, and an on or off valve 111 is disposed in each of the nozzles 110 to control the opening or closing of the corresponding nozzle 110. A direction switching valve 11, a flow rate control valve 12, and a flow rate detector 13 are disposed between the additional ejection device 200 and the pump 512 to control supply of water.

Then, the water in the internal of the water tank 510 is mixed with a fluorescent material or a surfactant so the flow of water may be easily identified by the cameras 300.

Wheels 501 are formed at a lower portion of the body 500 wherein the body 500 may be moved according to operations.

Further, the body 500 is provided with a monitor 520 connected to the control device 400 to identify materials related to the flows of water, which has been captured by the cameras 300.

Figure 4:
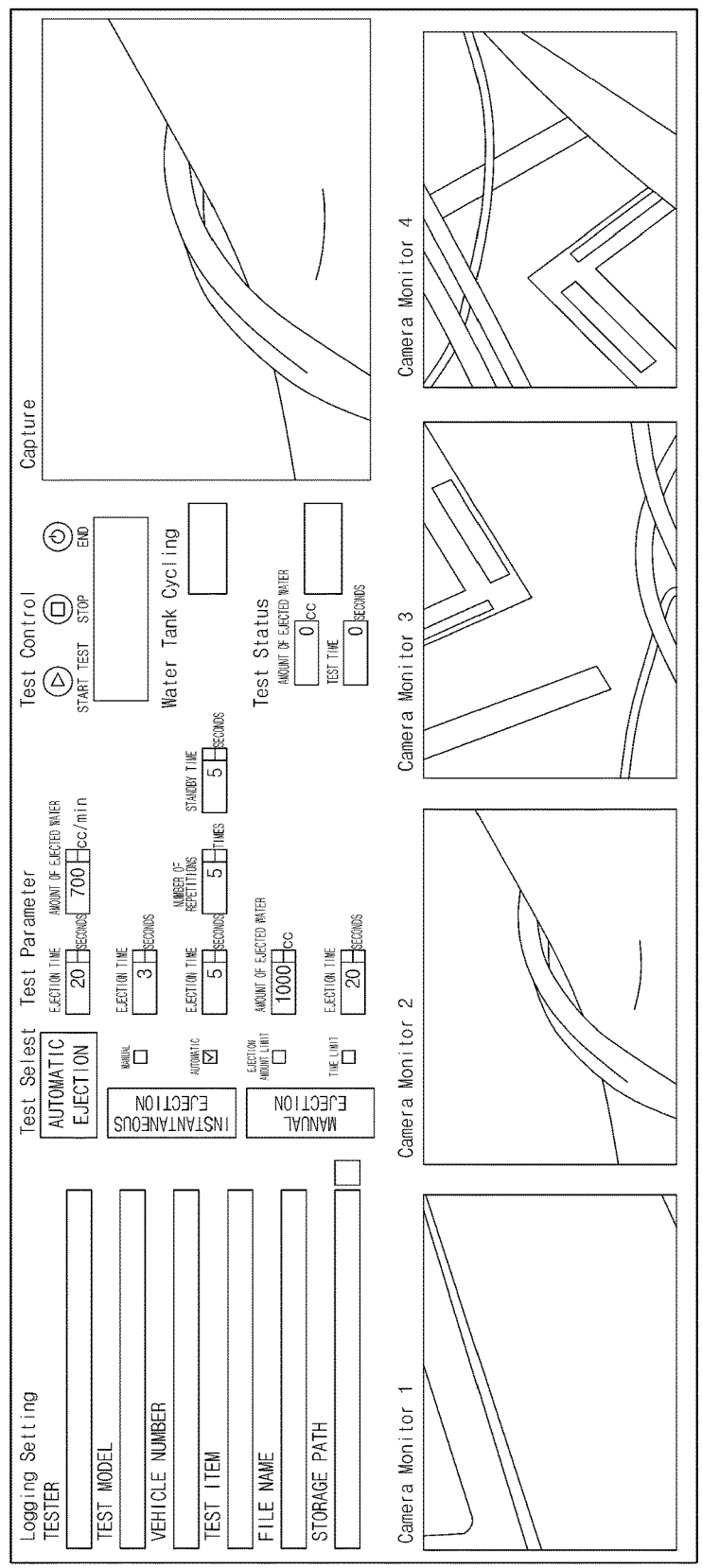
FIG. 4 is a view illustrating a monitor for controlling the apparatus for evaluating a watertight state of a vehicle according to an exemplar embodiment of the present invention.
Figure 5:
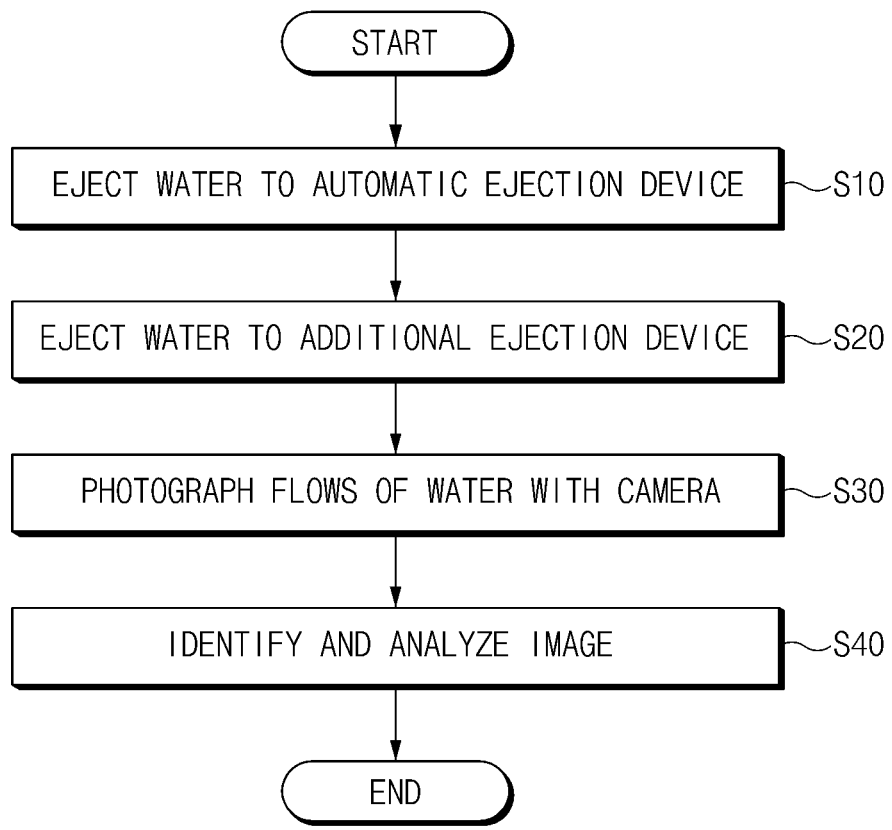
FIG. 5 is a flowchart illustrating a method for controlling the apparatus for evaluating a watertight state of a vehicle according to an exemplary embodiment of the present invention.

As illustrated in FIG. 4, the monitor 520 may be divided according to the number of cameras 300 wherein the images captured by the plurality of cameras 300 may be displayed.

Further, the monitor 520 may allow the user to identify the images, to start and end an operation of a water ejection apparatus for a vehicle according to an exemplary embodiment of the present invention through a program included in the control device 400, and to adjust an ejection time period, an amount of ejected water, and the number of ejections.

The body 500 is provided with a moveable and or fixed connector 530 at one end portion thereof, and the connector 530 is disposed with the automatic ejection device 100 and the additional ejection device 200 wherein the automatic ejection device 100 and the additional ejection device 200 may be moved to the internal of the vehicle and be fixed after being moved.

Further, the body 500 is disposed with a power source 540 to allow for the ejection of water, operations of the cameras 300, and the control device 400. The power source 540 is provided with a separate rechargeable battery to allow the operation of the present invention at a location where it is impossible to connect the power source 540 to a voltage supply source.

Meanwhile, the method of controlling the apparatus for evaluating the watertight state of a vehicle according to an exemplary embodiment of the present invention includes the operation S10 of automatically ejecting water toward the glass 1 of the vehicle, operation S20 of additionally ejecting water, operation S30 of photographing the flow of water, and operation S40 of identifying and analyzing the captured images. FIG. 1 to FIG. 3 will be referenced for the configuration related to the apparatus for evaluating a watertight state of a vehicle.

Further, the watertight state evaluation may be initiated or stopped through a program interworking with the control device of the present apparatus.

When the evaluation of the watertight state of the vehicle is initiated water is automatically ejected toward the glass 1 on the inside of the vehicle through the automatic ejection device 100 (S10).

Then, the flow rate of water ejected through the automatic ejection device 100 and the water ejection time period may be adjusted within the program setting ranges.

After the water is ejected toward the glass 1 of the vehicle by the automatic ejection device 100, water is further ejected through the additional ejection device 200 (S20).

Meanwhile, a process of ejecting water through the additional ejection device 200 includes automatically ejecting water by the number of repetitions for a predetermined ejection time period, manually ejecting water for a predetermined ejection time period, and manually ejecting water by adjusting an ejection time period and an amount of ejected water.

After water is completely ejected through the automatic ejection device 100 and additional ejection device 200, the cameras 300 photograph the flow of the ejected water on a lower portion of the glass 1.

Then, the plurality of cameras 300 may photograph the flow of water at other portions of the vehicle body as well as the lower portion of the glass 1.

After the lower portion of the glass 1 is photographed, the captured image is identified and analyzed wherein it is determined whether water is introduced into the vehicle body (S40).

Further, when the captured image is identified, it is possible to store data in an image file through an operation of a button.

Then, the introduction of water may be identified by determining the flow of water at a lower portion of the glass 1 through the captured image on the monitor 520.

In the present case, the present invention includes the automatic ejection device 100 having a plurality of nozzles 110 to automatically eject water to the glass 1 on the inside of the vehicle, the additional ejection device 200 configured to additionally eject water separately, the camera 300 configured to photograph the flow of the water at a lower portion of the glass 1 after water is ejected, and the control device 400 configured to control the ejection of water and identify the introduction of water into the internal of the vehicle through the material captured by the cameras 300, so that the evaluation of a watertight state between the vehicle body and the glass 1 may be preliminarily verified by automatically ejecting water to the glass 1 on the inside of the vehicle through the automatic ejection device 100 and the additional ejection device 200, photographing the flow of the ejected water through the cameras 300, identifying and analyzing the captured images, and detecting whether water is introduced into the internal of the vehicle. The safety and product value may be enhanced by preventing water from being introduced into the vehicle when the glass 1 of the vehicle is tinted.

According to an exemplary embodiment of the present invention, the watertight state between a vehicle body and a glass may be preliminarily verified by allowing water to flow to a lower end portion of the glass through an automatic ejection device and an additional ejection device, and detecting the introduction of water into the internal of the vehicle by photographing the flow of the water with a camera. The safety and product value may be enhanced by preventing a phenomenon in which water flows into the vehicle when the glass of the vehicle is tinted.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for evaluating a watertight state of a vehicle, the apparatus comprising:
    an automatic ejection device having a plurality of nozzles to automatically eject water to a glass on an inside of the vehicle;
    an additional ejection device configured to eject water separately from the automatic ejection device;
    a plurality of cameras configured to capture an image of flows of water when the water is ejected by the automatic ejection device and the additional ejection device,
    a control device configured to control ejection of the water while interworking with the automatic ejection device and the additional ejection device; and
    a body, on which the automatic ejection device and the additional ejection device are mounted and which is provided with the control device and the plurality of cameras,
    wherein the body further includes a monitor connected to the control device to display the image captured by the plurality of cameras, to start and end an operation of a water ejection apparatus through a program included in the control device, and to adjust an ejection time period, an amount of ejected water and a number of ejections,
    wherein the body further includes a water tank configured to supply water to the automatic ejection device and the additional ejection device and store the water and disposed with a pump configured to supply water,
    wherein a direction switching valve, flow rate control valve and a flow rate detector are included between the automatic ejection device and the pump to control supply of water, and
    wherein the plurality of nozzles included in the automatic ejection device eject the water in a plurality of steps through control of a button and allow control of the ejection time period and the amount of the elected water.

2. The apparatus of claim 1,
    wherein the control device is configured to identify introduction of the water into an internal of the vehicle through materials captured by the cameras.

3. The apparatus of claim 2, wherein each of the plurality of nozzles is provided with an on or off valve, and wherein the nozzles are independently switched on or off.

4. The apparatus of claim 2, wherein the automatic ejection device has a curved structure to be parallel to a front surface of an inside of the glass and is fixed to the glass.

5. The apparatus of claim 2, wherein the additional ejection device comprises:
    an instantaneous ejection device configured to eject a predetermined amount of water to the glass manually or automatically by use of a control button; and
    a manual ejection device configured to eject water manually to a predetermined location of the vehicle, including the glass.

6. The apparatus of claim 2, wherein the body is movable.

7. The apparatus of claim 2,
    wherein the monitor is connected to the control device to identify the materials in the image captured by the cameras.

8. The apparatus of claim 2, wherein the body further comprises:
    a connector configured to move the automatic ejection device and the additional ejection device to the internal of the vehicle and fix the automatic ejection device and the additional ejection device.

9. The apparatus of claim 2, wherein the water tank further comprises:
    a filter configured to filter the water supplied to the automatic ejection device and the additional ejection device.

* * * * *